US008189952B2

(12) United States Patent
Chen et al.

(10) Patent No.: US 8,189,952 B2
(45) Date of Patent: May 29, 2012

(54) IMAGE NOISE REDUCTION METHOD BASED ON LOCAL CORRELATION

(75) Inventors: Chao-Ho Chen, Tai-Nan (TW); Ming-Kun Wu, Kaohsiung County (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 1024 days.

(21) Appl. No.: 11/615,998

(22) Filed: Dec. 25, 2006

(65) Prior Publication Data

US 2007/0196031 A1 Aug. 23, 2007

Related U.S. Application Data

(60) Provisional application No. 60/766,971, filed on Feb. 22, 2006.

(51) Int. Cl.
*G06K 9/40* (2006.01)

(52) U.S. Cl. ........ 382/275; 382/254; 382/260; 382/261; 382/262; 382/271; 358/3.26; 358/448; 358/463

(58) Field of Classification Search .................. 382/100, 382/254–275; 358/2.1, 3.21, 3.24, 3.26, 358/448, 461, 462, 463
See application file for complete search history.

(56) References Cited

U.S. PATENT DOCUMENTS

| 4,747,156 | A | * | 5/1988 | Wahl | 382/275 |
| 4,843,568 | A | * | 6/1989 | Krueger et al. | 382/100 |
| 5,054,099 | A | * | 10/1991 | Wakabayashi et al. | 382/298 |
| 5,903,681 | A | * | 5/1999 | Rueby et al. | 382/266 |
| 5,946,416 | A | * | 8/1999 | Akagi et al. | 382/194 |
| 5,970,164 | A | * | 10/1999 | Bamberger et al. | 382/274 |
| 5,974,197 | A | * | 10/1999 | Lee et al. | 382/268 |
| 6,195,467 | B1 | * | 2/2001 | Asimopoulos et al. | 382/261 |
| 6,408,028 | B1 | * | 6/2002 | Manjunath et al. | 382/243 |
| 7,016,549 | B1 | * | 3/2006 | Utagawa | 382/261 |
| 7,463,785 | B2 | * | 12/2008 | Ebisawa | 382/266 |
| 7,474,800 | B2 | * | 1/2009 | Moskvitin | 382/275 |

FOREIGN PATENT DOCUMENTS

| EP | 0 721 286 A2 | 7/1996 |
| EP | 1 061 734 A2 | 12/2000 |
| JP | 1117954 | 1/1999 |
| JP | 1141491 | 2/1999 |

OTHER PUBLICATIONS

Jason Y. F. Ho, "Peer Region Determination Based Impulsive Noise Detection" IEEE Conference on Acoustics, Speech and Signal Processing, vol. 3, May 21, 2003, pp. III-713-III-716.*

* cited by examiner

*Primary Examiner* — Matthew Bella
*Assistant Examiner* — Eric Rush
(74) *Attorney, Agent, or Firm* — Winston Hsu; Scott Margo

(57) ABSTRACT

A method for reducing image noise includes calculating a first pixel amount of pixels that are similar to each other in a first number neighbor of a center pixel in a motion window, determining whether the first pixel amount of pixels that are similar to each other in the first number neighbor is greater than a first predetermined value, and using a mean of those pixels of the first pixel amount of pixels that are similar to each other in the first number neighbor to restore the center pixel of the motion window if the first pixel amount of pixels is greater than the first predetermined value. The method includes determining whether a second pixel amount of pixels that are similar to the center pixel is greater than a second predetermined value if the first pixel amount of pixels is not greater than the first predetermined value.

10 Claims, 12 Drawing Sheets

| 107 | 89 | 34  | 106 | 107 |
| --- | -- | --- | --- | --- |
| 108 | 89 | 112 | 105 | 111 |
| 29  | 89 | 111 | 105 | 110 |
| 107 | 89 | 107 | 107 | 111 |
| 104 | 89 | 23  | 112 | 112 |

Fig. 3

|  |  |  |  |  |
|---|---|---|---|---|
| 79 | 81 | 82 | 255 | 0 |
| 79 | 80 | 83 | 88 | 82 |
| 80 | 0 | 0 | 0 | 83 |
| 79 | 83 | 82 | 84 | 82 |
| 81 | 84 | 82 | 255 | 255 |

Fig. 6

| 79 | 81 | 82 | 255 | 0 |
|----|----|----|-----|----|
| 79 | 80 | 83 | 88 | 82 |
| 80 | 0 | 83 | 0 | 83 |
| 79 | 83 | 82 | 84 | 82 |
| 81 | 84 | 82 | 255 | 255 |

Fig. 7

| Noise ratio | Peak-signal-to-noise ratio (PSNR) (dB) | | | | | |
|---|---|---|---|---|---|---|
| | ATPMF Filter | Truncation Filter | DRID Filter | CSAM Filter | MSM Filter | Filter provided in the present invention |
| 5% | 33.03 | 27.72 | 31.24 | 30.61 | 38.67 | 35.73 |
| 10% | 32.55 | 22.88 | 26.2 | 30.35 | 36.42 | 34.28 |
| 15% | 32.03 | 20.11 | 23.14 | 30.05 | 33.96 | 33.15 |
| 20% | 31.46 | 18.22 | 20.98 | 29.7 | 31.46 | 32.24 |
| 25% | 30.79 | 16.82 | 19.3 | 29.29 | 29.07 | 31.36 |
| 30% | 29.96 | 15.72 | 17.95 | 28.81 | 26.86 | 30.54 |
| 35% | 28.9 | 14.82 | 16.82 | 28.23 | 24.92 | 29.66 |
| 40% | 27.58 | 14.08 | 15.85 | 27.49 | 23.16 | 28.67 |
| 45% | 26.07 | 13.43 | 15.01 | 26.53 | 21.61 | 27.52 |
| 50% | 24.46 | 12.87 | 14.26 | 25.34 | 20.22 | 26.13 |

Fig. 9

| Noise ratio | Peak-signal-to-noise ratio (PSNR) (dB) | | | | | |
|---|---|---|---|---|---|---|
| | ATPMF Filter | Truncation Filter | DRID Filter | CSAM Filter | MSM Filter | Filter provided in the present invention |
| 5% | 36.25 | 27.51 | 31.3 | 33.85 | 41.95 | 38.07 |
| 10% | 35.41 | 22.55 | 26.11 | 33.29 | 38.44 | 36.32 |
| 15% | 34.57 | 19.76 | 22.99 | 32.66 | 35.03 | 35 |
| 20% | 33.7 | 17.87 | 20.78 | 31.99 | 31.86 | 33.9 |
| 25% | 32.64 | 16.47 | 19.07 | 31.26 | 29.06 | 32.86 |
| 30% | 31.32 | 15.37 | 17.71 | 30.47 | 26.65 | 31.84 |
| 35% | 29.74 | 14.49 | 16.57 | 29.53 | 24.54 | 30.69 |
| 40% | 27.89 | 13.74 | 15.59 | 28.36 | 22.72 | 29.41 |
| 45% | 25.91 | 13.1 | 14.73 | 26.9 | 21.12 | 27.86 |
| 50% | 24.02 | 12.54 | 13.97 | 25.23 | 19.69 | 26.11 |

Fig. 11

| Noise density ($\rho$) | Motion window size |
|---|---|
| $0\% < \rho \leqq 15\%$ | 3*3 |
| $15\% < \rho \leqq 30\%$ | 5*5 |
| $30\% < \rho \leqq 45\%$ | 7*7 |
| $45\% < \rho \leqq 60\%$ | 9*9 |
| $60\% < \rho \leqq 70\%$ | 11*11 |

Fig. 12

IMAGE NOISE REDUCTION METHOD BASED ON LOCAL CORRELATION

CROSS REFERENCE TO RELATED APPLICATIONS

This application claims the benefit of U.S. Provisional Application No. 60/766,971, filed Feb. 22, 2006, and included herein by reference.

BACKGROUND OF THE INVENTION

1. Field of the Invention

The present invention relates to an image noise reduction method, and more particularly, to an image noise reduction method by determining similarity between a center pixel and adjacent pixels to reduce image noise.

2. Description of the Prior Art

In an era of multimedia communication, image data is playing an important role. But no images are absolutely perfect no matter how good a camera is, since images are interfered by the presence of noise. The principal sources of noise in digital images arise during image acquisition (digitization) and/or transmission. The performance of imaging sensors is affected by a variety of factors, such as environmental conditions during image acquisition, and by the quality of the sensing elements themselves. For instance, in acquiring images with a CCD camera, luminosity and sensor temperature are major factors affecting the amount of noise in the generated images. Images are corrupted during transmission principally due to interference in channels used for transmission. For example, an image transmitted by a wireless network might be disturbed as a result of lightning or other atmospheric charged particles.

Filtering a digital image is one necessary part in image processing and is used for reducing noise when protecting image details. For example, any noise in images will result in serious errors due to many applications being based on operands drawn out from applications for calculating images. Therefore, filtering methods for reducing noise are desired not only to improve the visual quality, but also to improve the performance of subsequent processing tasks such as coding, analysis cutting, identification, or interpretation.

In digital images, image pixels are usually interfered by impulse noise due to wrong image acquisition equipments, ill image acquisition conditions, or errors in image transmission. The median filter provides perfect noise reduction capability to certain kinds of random noise and generates clearer images than linear smooth filters with the same size. Impulse noises are discovered easily by human eyes and cause serious mistakes in image processing applications. Hence, impulse noises are used for front end processing in some image processing system, such as image quantification. A best impulse noise filter must have capacity to smooth non-similar pixels in identical areas, to keep edge information, and not to change any natural image information. Different impulse noise reduction algorithms are already disclosed in the past years, their purposes are to filter impulse noise and to keep image details at the same time. Some typical non-linear filters, such as median filters and weighted median filters are used for reducing almost all impulse noises and keeping almost all image details.

Applications of reducing image noise are already disclosed by some scholars. For example, a differential rank impulse detector (DRID) is provided in the prior art for detecting impulse noise effectively. In a motion window, the difference between the arrangement sequence of impulse noise and the arrangement sequence of a center pixel is very large. The median values in different sequences always lie in the middle, but the median value of impulse noises lie near two extremities. A simple impulse noise detector can be obtained for this reason, its conception is comparing the location of desired pixel with a threshold and can be expressed in the following equation:

$$(R(X_{i,j}) \leq s) \vee (R(X_{i,j})) \geq N-s+1;$$

wherein, $X_{i,j}$ is a center pixel of a motion window, $R(X_{i,j})$ is a rank after sorting, N is a pixel amount of pixels in the motion window, and s is a threshold value. It is easy to determine noise interference and to get great effect through this method, but there are many erroneous judgments and whether a pixel is interfered by noise or not is not guaranteed. A pixel is regarded as noise if it is not interfered by noise and not sorted near two extremities. In order to overcome this problem, not only the sorting sequence but also the gray scale value should be considered. The algorithm can be expressed as another equation:

$$(R(X_{i,j}) \leq s) \wedge (R(X_{i,j}) \geq (N-s+1))^{\hat{}} (d_{i,j} \geq \theta);$$

wherein, $d_{i,j}$ can be expressed as:

$$d_{i,j} \equiv \begin{cases} |x_{i,j} - \text{Var}[R(x_{i,j})-1]|, & \text{if } R(x_{i,j}) > MED_{i,j} \\ |x_{i,j} - \text{Var}[R(x_{i,j})+1]|, & \text{if } R(x_{i,j}) < MED_{i,j} \\ 0, & \text{else} \end{cases}$$

Var(k) is the gray scale value of a sorting K. The detector provides an effective, fast, with non-smooth image, and can be applied in any other filter method based on comparing the location of pixels with an absolute value.

In another reference document, a conditional signal-adaptive median filter (CSAM) is provided in the prior art, which is a median filter based on judgments. The filter is consisted of two primary functions-necessary conditions for determination and method for filtering noise. The first function is used for determining whether noise exists in a motion window or not, and the second function is used for smoothing pixel value of noise. The algorithm is expressed as the following:

Step 1: Calculating Upper Limits and Lower Limits in Identical Areas.

Step 2: Detecting Impulse Noises.

In a 3×3 motion window, let a center pixel be $X_0$, 8 neighbors be $z_i|_{i=1}^{8}$, $c_h$ be a pixel amount of pixels that is identical to the center pixel $X_0$ in the 8 neighbors, and $c_i$ be a pixel amount of pixels that is not identical to the center pixel $X_0$ in the 8 neighbors. The center pixel $X_0$ is determined to be noise if the value $c_h$ is greater than the value $c_i$, and the center pixel $X_0$ is determined to be a noise candidate if the value $c_h$ is not greater than the value $c_i$.

Step 3: Refining the Selected Impulse Noise.

Different filtering is utilized to remove pixels not interfered by noise from the noise candidate to lower error detections. Those erroneous detected pixels lie most near edge and image details. Dividing those pixels into two groups: one group is similar to the center pixel, and the other group is not similar to the center pixel. The center pixel is determined as signal and is removed from the noise candidate if the pixel amount of pixels that are similar to the center pixel is greater than the pixel amount of pixels that are not similar to the center pixel. The step is executed continuously till the number of the noise candidate is not decreased anymore.

Step 4: Using a Median Filter to Reduce Noise.

A 3×3 median filter is used to reduce noise in a 3×3 motion window if the pixel amount of pixels that are similar to the center pixel is smaller than 3. Otherwise, a 5×5 median filter is used to reduce noise. The objective of the method is to reach perfect impulse noise detection and to keep superior visible quality after restoring.

Furthermore, a truncation filter is provided in the prior art. X(i,j) represents a gray scale of a pixel (i,j), and N square windows of an M×M size having the pixel (i,j) can be found. This kind of window is called internal window and is expressed as $WI_k$. For each internal window, a corresponding external window $WO_k$ of an (M+2r)×(M+2r) size can be found, wherein r≧1. The internal window $WI_k$ and the corresponding external window $WO_k$ have the same center. Therefore, N close surrounding bands $B_K$ having a thickness r can be found (wherein K=1 ... N). The close surrounding bands $B_K$ are defined as $B_K = WO_K - WI_K$. Suppose $u_k$ and $v_k$ represent the maximum gray scale and the minimum gray scale in each close surrounding band $B_K$, the maximum gray scale and the minimum gray scale of its surrounding groups are used for determining whether noise interference is present or not. The objective of this method is protecting image details when reducing noise.

An adaptive two-pass median filtering (ATPMF) is provided in the prior art. Sorting filters such as median filters may result in poor performance when the noise ratio is high. Proceeding with this kind of filters twice will get better performance, which is called two-pass. This method works for two targets: the first, more noise can be reduced by utilizing this two-pass median filtering than a general median filtering when the noise ratio is high; the second, estimated space distribution of impulse noise is utilized to correct errors resulting from the first time filtering. The conception of this method is described in the following:

Step 1: The estimated space distribution and impulse noise value are obtained by utilizing a median filter to reduce image noise.

Step 2: Determining which pixels after reducing noise in step 1 are over-corrected, and using original pixel values to replace these pixels and keeping its value in step 3.

Step 3: Using the median filter to reduce image noise again.

The objective of this method is for being applied in any sorting filters when filtering image that is interfered by high noise ratio.

Thus it can be seen, numerous image noise reduction algorithms are already disclosed in the prior art. In some algorithms, only images that are interfered by high ratio impulse noise are suitable for use. In some conditions, error judgment may happen. Moreover, not only reducing noise effectively but also protecting image details should be a concern.

SUMMARY OF THE INVENTION

The claimed invention provides an image noise reduction method based on local correlation. The method includes calculating a first pixel amount of pixels that are similar to each other in a first number of neighbors of a central pixel in a motion window, determining whether the first pixel amount of pixels that are similar to each other in the first number of neighbors is greater than a first predetermined value, and using a mean of those pixels of the first pixel amount of pixels that are similar to each other in the first number of neighbors to restore the central pixel of the motion window if the first pixel amount of pixels is greater than the first predetermined value. The method further includes calculating a pixel amount of pixels that are similar and adjacent to the center pixel in the motion window, determining whether the pixel amount of pixels that are similar and adjacent to the center pixel is smaller than a predetermined amount, determining whether the center pixel is located on a thin line if the pixel amount of pixels that are similar and adjacent to the center pixel is smaller than the predetermined amount, and determining whether the center pixel is noise or not according to a result of determining whether the center pixel is located on the thin line. Filtering the center pixel is performed if the center pixel is not located on the thin line, or determining the center pixel is not noise if the center pixel is located on the thin line.

The claimed invention provides an image noise reduction method based on local correlation. The method includes calculating a first pixel amount of pixels that are similar to each other in a first number of neighbors of a central pixel in a motion window, calculating a second pixel amount of pixels that are similar to the center pixel in the first number of neighbors of the central pixel, determining whether the first pixel amount of pixels that are similar to each other in the first number of neighbors is greater than a first predetermined value, determining whether the second pixel amount of pixels that are similar to the center pixel in the first number of neighbors of the central pixel is greater than a second predetermined value if the first pixel amount of pixels that are similar to each other in the first number of neighbors is not greater than the first predetermined value, and filtering the center pixel of the motion window according to a result of determining whether the second pixel amount of pixels that are similar to the center pixel in the first number of neighbors of the central pixel is greater than the second predetermined value. Using a 5×5 median filter to filter the center pixel of the motion window if the second pixel amount of pixels that are similar to the center pixel in the first number of neighbors of the central pixel is greater than the second predetermined value. Using a 3×3 median filter to filter the center pixel of the motion window if the second pixel amount of pixels that are similar to the center pixel in the first number of neighbors of the central pixel is not greater than the second predetermined value.

The claimed invention provides a method for detecting image noise. The method includes calculating a pixel amount of pixels that are similar and adjacent to the center pixel in the motion window, determining whether the pixel amount of pixels that are similar and adjacent to the center pixel is smaller than a predetermined amount, determining whether the center pixel is located on a thin line if the pixel amount of pixels that are similar and adjacent to the center pixel is smaller than the predetermined amount, and determining whether the center pixel is noise or not according to a result of determining whether the center pixel is located on the thin line. Filtering the center pixel if center pixel is not located on the thin line, or determining the center pixel is not noise if center pixel is located on the thin line is performed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram of an embodiment for detecting image noise in the present invention.

FIG. 6 is a diagram of an embodiment for restoring noise in the present invention.

FIG. 7 is a diagram showing the center pixel after restoring in FIG. 6.

FIG. 9 is a diagram comparing peak-signal-to-noise ratio (PSNR) in the prior art with the present invention by utilizing the test image in FIG. 8.

FIG. 11 is a diagram comparing peak-signal-to-noise ratio (PSNR) in the prior art with the present invention by utilizing the test image in FIG. 10.

FIG. 12 is a diagram illustrating relationship between the noise density and the motion window size.

DETAILED DESCRIPTION

The present invention provides an image noise reduction method based on local correlation. The present invention can be seen in several levels. The first determines whether a center pixel is noise or not according to the step of determining similarities between the center pixel and the adjacent pixels and the step of determining whether the center pixel is located on a thin line during noise detection stage. The next, an algorithm describing how to estimate original pixel values of pixels that are interfered with by noise and restore the center pixel according to some judgment result during restoration. Finally, adding different noise ratios of impulse noise randomly into test images to offer proof of the efficiency of the claimed invention, and going a step further, the claimed invention and the prior art are compared.

Figure 1:
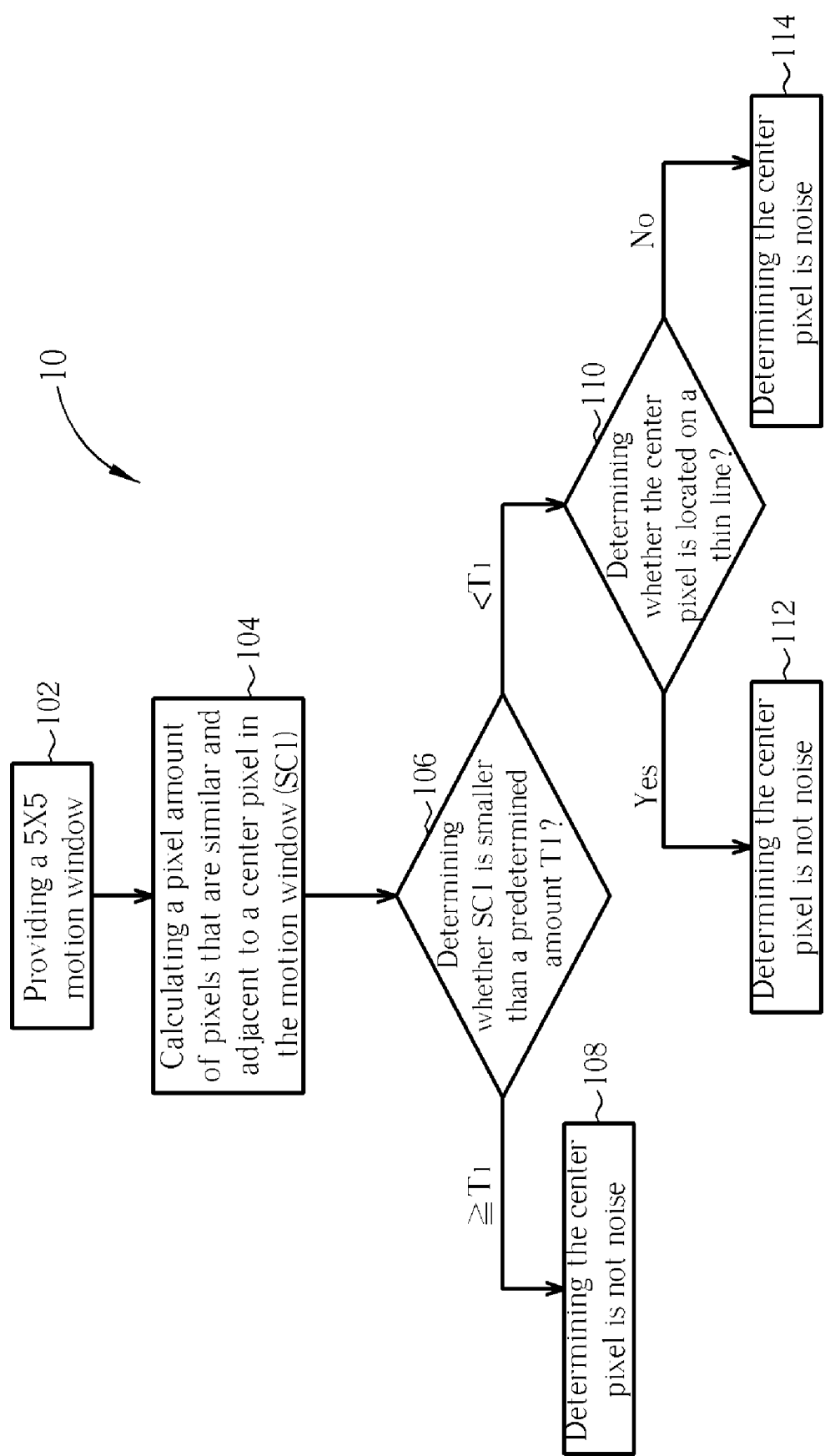
FIG. 1 is a diagram of a flow chart illustrating a method for detecting image noise according to an embodiment of the present invention.

Please refer to FIG. 1. FIG. 1 is a diagram of a flow chart 10 illustrating a method for detecting image noise according to an embodiment of the present invention. The flow chart 10 includes the following steps:

Step 102: Providing a 5×5 motion window.

Step 104: Calculating a pixel amount of pixels that are similar and adjacent to a center pixel in the motion window (SC1).

Step 106: Determining whether the pixel amount of pixels SC1 that are similar and adjacent to a center pixel in the 5×5 motion window is smaller than a predetermined amount T1.

Step 108: Determining the center pixel is not noise.

Step 110: Determining whether the center pixel is located on a thin line.

Step 112: Determining the center pixel is not noise.

Step 114: Determining the center pixel is noise.

In step 106, the center pixel is determined as noise or not according to a result of determining the pixel amount of pixels SC1 that are similar and adjacent to a center pixel in the 5×5 motion window. The center pixel is determined not to be noise if the pixel amount of pixels SC1 that are similar and adjacent to a center pixel in the 5×5 motion window is not smaller than the predetermined amount T1 (step 108). The center pixel is determined to be located on a thin line if the pixel amount of pixels SC1 that are similar and adjacent to a center pixel in the 5×5 motion window is smaller than the predetermined amount T1 (step 110). In step 110, the center pixel is determined as noise or not according to a result of determining whether the center pixel is located on the thin line. The center pixel is determined not to be noise if the center pixel is located on the thin line. The center pixel is determined to be noise if the center pixel is not located on the thin line.

Figure 2:
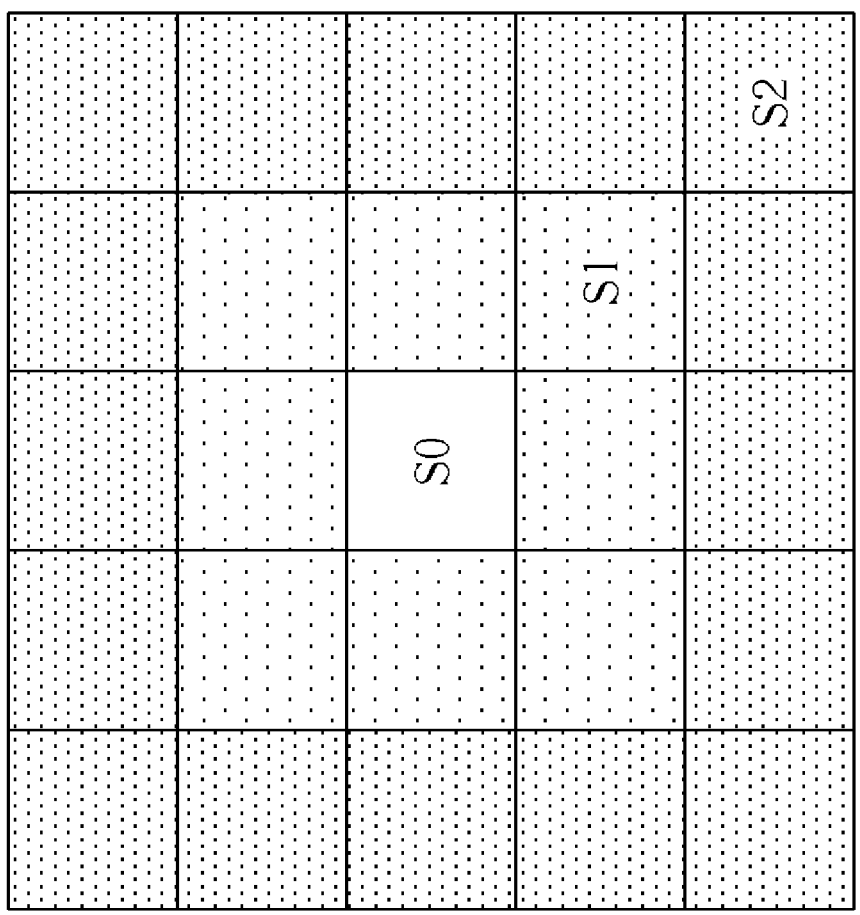
FIG. 2 is a diagram of a motion window of a size of 5×5 according to an embodiment of the present invention.

Please refer to FIG. 2 that is a diagram of a motion window of a size of 5×5 according to an embodiment of the present invention. The 5×5 motion window is divided into three parts: the center pixel is an area S0, the 8 neighbors of the central pixel is an area S1, and the outer pixels are an area S2.

Please refer to FIG. 3 and FIG. 2. FIG. 3 is a diagram of an embodiment for detecting image noise in the present invention. Please correspond locations in FIG. 3 to each area in FIG. 2. As shown in FIG. 3, the pixel value of the center pixel is 111, the pixel value of the 8 neighbors of the central pixel are 89, 89, 89, 112, 105, 105, 107, and 107(clockwise), and pixels in the area S2 are 104, 107, 29, 108, 107, 89, 34, 106, 107, 111, 110, 111, 112, 112, 23, and 89(clockwise). The first, determine whether the 8 neighbors in the area S1 are similar to the center pixel (111). Assume that the judgment standard of the threshold value T is set as 18, only pixels with value 112, 105, 105, 107, and 107 in the area S1 are similar to the center pixel. Then determine whether pixels in the area S2 adjacent to those pixels in the area S1 similar to the center pixel are similar to the center pixel. Only pixels with value 106, 107, 111, 110, 111, 112, and 112 in the area S2 are similar to the center pixel. Therefore, the pixel amount of pixels SC1 that are similar and adjacent to a center pixel in the 5×5 motion window is 12. Determine the center pixel is not noise and ending the method for detecting image noise, if the pixel amount SC1 is not smaller than the predetermined amount $T_1$. Determine whether the center pixel located on a thin line if the pixel amount SC1 is smaller than the predetermined amount $T_1$. Let the predetermined amount be 9. Due to the pixel amount SC1 that are similar and adjacent to a center pixel in the 5×5 motion window is greater than the predetermined amount $T_1$ (12>9), determines the center pixel (111) is signal and outputs it directly.

Figure 4:
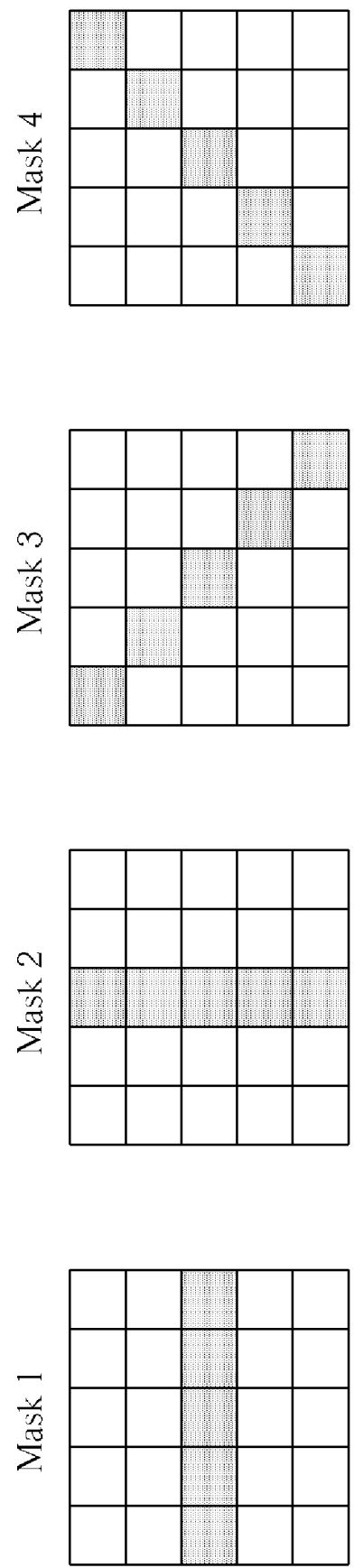
FIG. 4 is a diagram showing a thin line of the motion window in the present invention.

Please refer to FIG. 4. FIG. 4 is a diagram showing a thin line of the motion window in the present invention. These masks can be expressed in the following equations: If number $$\{|x_{0,0} - x_{i,j}| \le T \mid (i, j) = \{(a + m, b + n)\}\} = 4,$$

then the central pixel has been regarded it is on a line for:

$(a,b)=(0,-2), m=0, 0 \le n \le 4, n \ne 2;$  Mask 1:

or $(a,b)=(-2,0), 0 \le m \le 4, m \ne 2, n=0;$  Mask 2:

or $(a,b)=(-2,-2), 0 \le m \le 4, m \ne 2, 0 \le n \le 4, n \ne 2;$  Mask 3:

or $(a,b)=(-2,2), 0 \le m \le 4, m \ne 2, 0 \ge n \le -4, n \ne -2;$  Mask 4:

These masks are used for determining whether the center pixel is located on a thin line or not. If any one of those four masks is met, it means the central pixel has not been influenced by noise.

Figure 5:
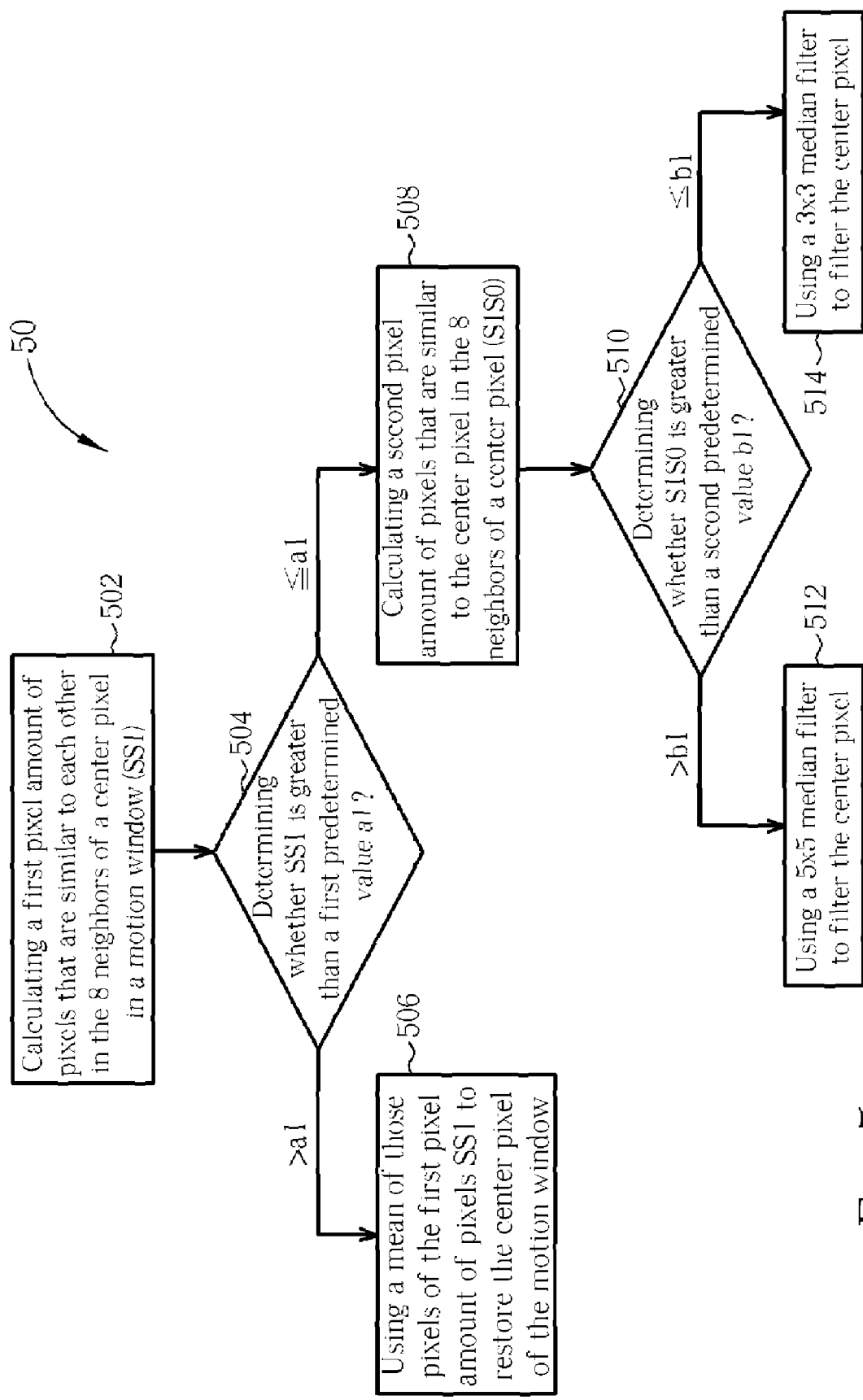
FIG. 5 is a diagram of a flow chart illustrating an image reduction method based on local correction according to an embodiment of the present invention.

Please refer to FIG. 5. FIG. 5 is a diagram of a flow chart 50 illustrating an image reduction method based on local correction according to an embodiment of the present invention. The flow chart 50 includes the following steps:

Step 502: Calculating a first pixel amount of pixels that are similar to each other in the 8 neighbors of a center pixel in a motion window (SS1).

Step 504: Determining whether SS1 is greater than a first predetermined value a1.

Step 506: Using a mean of those pixels of the first pixel amount of pixels SS1 to restore the center pixel of the motion window.

Step 508: Calculating a second pixel amount of pixels that are similar to the center pixel in the 8 neighbors of a center pixel (S150).

Step 510: Determining whether S150 is greater than a second predetermined value b1.

Step 512: Using a 5×5 median filter to filter the center pixel.

Step 514: Using a 3×3 median filter to filter the center pixel.

In step 506, the mean of those pixels of the first pixel amount of pixels SS1 is used to restore the center pixel of the motion window if the first pixel amount of pixels SS1 that is similar to each other in the 8 neighbors of a center pixel is greater than the first predetermined value a1. The second pixel amount of pixels S1S0 that are similar to the center pixel in the 8 neighbors of the center pixel is calculated if the first pixel amount of pixels SS1 that is similar to each other in the 8 neighbors of a center pixel is not greater than the first predetermined value a1 (step 508). In step 510, a 5×5 median filter or a 3×3 median filter is respectively used to filter the center pixel according to a result of determining whether S1S0 is greater than the second predetermined value b1.

Please refer to FIG. 6 that is a diagram of an embodiment for restoring noise in the present invention. As shown in FIG. 6, the pixel value of the center pixel is 0, and the 8 neighbors of the center pixel in the area S1 are 83, 0, 80, 83, 88, 0, 84, and 82 respectively (clockwise). In the first determining the first pixel amount of pixels SS1 that is similar to each other in the 8 neighbors in the area S1, the first pixel amount of pixels SS1 is six having a pixel value of 83, 80, 83, 88, 84, and 82.

Please refer to FIG. 7 that is a diagram showing the center pixel after restoration in FIG. 6. Let the first predetermined value a1 be 4, then the first pixel amount of pixels SS1 is greater than the first predetermined value a1 (6>4). As shown in FIG. 7, the mean (83) of these six pixels that are similar to each other is used to restore the pixel value of the center pixel.

Figure 8:
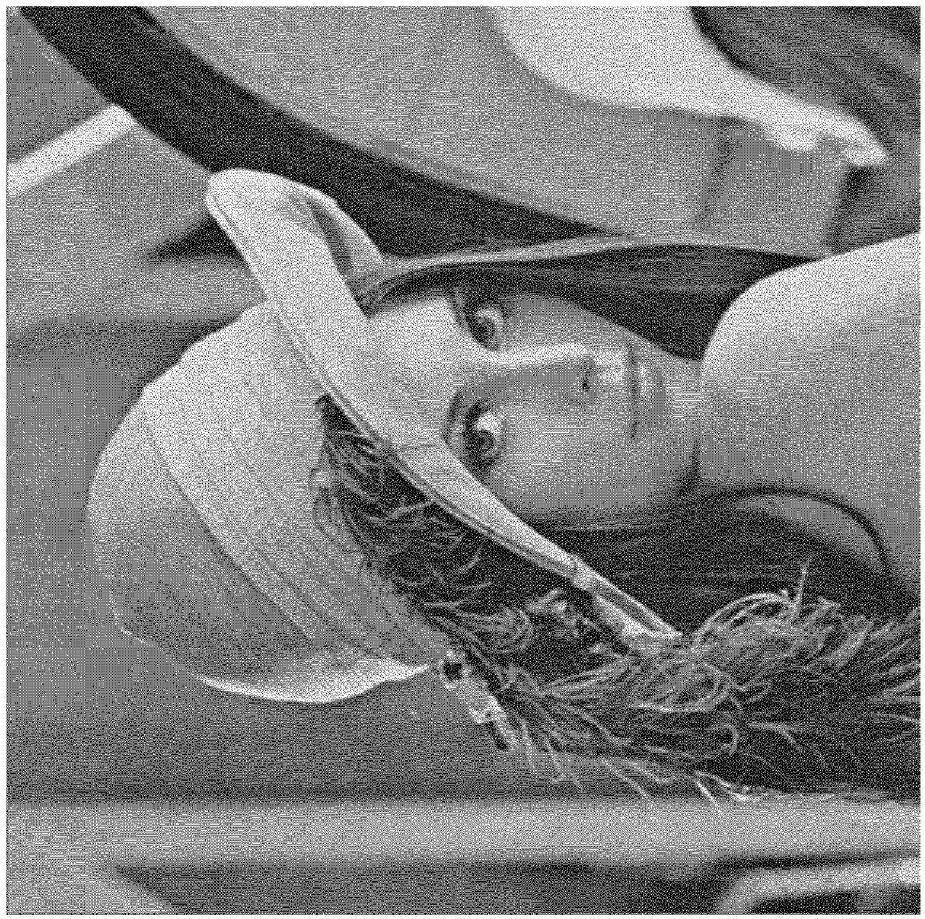
FIG. 8 is a diagram of a test image according to an embodiment of the present invention.

Please refer to FIG. 8. FIG. 8 is a diagram of a test image according to an embodiment of the present invention.

Please refer to FIG. 9. FIG. 9 is a diagram comparing peak-signal-to-noise ratios (PSNR) in the prior art with the present invention by utilizing the test image in FIG. 8. Some impulse noises are added into the test image in FIG. 8, the noise ratios are 5%, 10%, 15%, 20%, 25%, 30%, 35%, 40%, 45%, and 50% respectively. Random-value impulse noises are adopted in all tests, their pixel values are distributed from 0 to 255 uniformly.

Figure 10:
FIG. 10 is a diagram of another test image according to an embodiment of the present invention.

Please refer to FIG. 10 that is a diagram of another test image according to an embodiment of the present invention.

Please refer to FIG. 11. FIG. 11 is a diagram comparing peak-signal-to-noise ratios (PSNR) in the prior art with the present invention by utilizing the test image in FIG. 10. Some impulse noises are added into the test image in FIG. 10, the noise ratios are 5%, 10%, 15%, 20%, 25%, 30%, 35%, 40%, 45%, and 50% respectively. Random-value impulse noises are adopted in all tests, their pixel values are distributed from 0 to 255 uniformly.

Please refer to FIG. 12. FIG. 12 is a diagram illustrating relationships between the noise density and the motion window size. A size of a motion window is determined according to the noise density in the motion window. Using a smaller size motion window could obtain good effect and operate rapidly if the noise density is smaller. Using a larger size motion window could obtain better effect if the noise density is larger.

The above-mentioned embodiments illustrate but do not limit the present invention. The parameters mentioned above, for example, the first predetermined value a1, the second predetermined value a2, and the predetermined amount $T_1$ are not limited to fixed value and can be adjusted according to different image characteristics to reach better noise reduction efficiency. Furthermore, the 5×5 size of the motion window in the embodiment of the present invention is a preferred example only and the present invention is not intended to be restricted to this only to this size, but also extends to a motion window of other sizes.

In conclusion, the present invention provides an image noise reduction method based on local correlation. The similarity between the center pixel and the 8 neighbors is obtained by determining whether the first pixel amount of pixels SS1 that are similar to each other in the 8 neighbors is greater than the first determined value a1 and determining whether the second pixel amount of pixels S1S0 that are similar to the center pixel is greater than the second predetermined value b1. For a further step, how to restore the center pixel to reach better reduction effect and protect image details is determined. Furthermore, efficiency of filters is improved by selecting these parameters, such as the first predetermined value a1, the second predetermined value b1, and the predetermined amount T1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image noise reduction method based on local correlation comprising:

calculating a first pixel amount of pixels that are similar to each other in a first number neighbors of a central pixel in a motion window, wherein the pixels of the first pixel amount that are similar to each other need not to be similar to the central pixel, and the first number neighbors need not be equal to each other;

calculating a second pixel amount of pixels that are similar to the center pixel in the first number neighbors of the central pixel;

determining whether the first pixel amount of pixels that are similar to each other in the first number neighbors is greater than a first predetermined value;

determining whether the second pixel amount of pixels that are similar to the center pixel in the first number neighbors of the central pixel is greater than a second predetermined value if the first pixel amount of pixels that are similar to each other in the first number neighbors is not greater than the first predetermined value; and filtering the center pixel of the motion window according to a result of determining whether the second pixel amount of pixels that are similar to the center pixel in the first number neighbors of the central pixel is greater than the second predetermined value.

2. The image noise reduction method of claim 1 wherein filtering the center pixel of the motion window according to the result of determining whether the second pixel amount of pixels that are similar to the center pixel in the first number neighbors of the central pixel is greater than the second predetermined value comprises:

using a 5×5 median filter to filter the center pixel of the motion window if the second pixel amount of pixels that are similar to the center pixel in the first number neighbors of the central pixel is greater than the second predetermined value.

3. The image noise reduction method of claim 1 wherein filtering the center pixel of the motion window according to the result of determining whether the second pixel amount of pixels that are similar to the center pixel in the first number neighbors of the central pixel is greater than the second predetermined value comprises:

using a 3×3 median filter to filter the center pixel of the motion window if the second pixel amount of pixels that are similar to the center pixel in the first number neighbors of the central pixel is not greater than the second predetermined value.

4. The image noise reduction method of claim 1 wherein calculating the second pixel amount of pixels that are similar to the center pixel in the first number neighbors of the central pixel is calculating the second pixel amount of pixels that has a difference between a pixel value of the center pixel smaller than a first threshold value in the first number neighbors of the central pixel.

5. The image noise reduction method of claim 1 further comprising:

calculating a third pixel amount of pixels that are similar to the center pixel and located in a first area immediately adjacent to the center pixel in the motion window, and calculating a fourth pixel amount of pixels that are not only similar to the center pixel but also adjacent to pixel(s) of the third pixel amount in the first area, and located in a second area immediately adjacent to the first area in the motion window, wherein a size of the motion window is not less than 5×5;

determining whether a sum of the third pixel amount of pixels that are similar to the center pixel and located in the first area immediately adjacent to the center pixel and the fourth pixel amount of pixels that are similar to the center pixel and located in the second area immediately adjacent to the first area is smaller than a predetermined amount;

determining whether the center pixel is located on a thin line if the sum is smaller than the predetermined amount; and determining whether the center pixel is noise or not according to a result of determining whether the center pixel is located on the thin line.

6. The image noise reduction method of claim 5 wherein determining whether the center pixel is noise or not according to the result of determining whether the center pixel is located on the thin line comprises:

filtering the center pixel if center pixel is not located on the thin line.

7. The image noise reduction method of claim 5 wherein determining whether the center pixel is noise or not according to the result of determining whether the center pixel is located on the thin line comprises:

determining the center pixel is not noise if center pixel is located on the thin line.

8. The image noise reduction method of claim 5 wherein determining whether the center pixel is located on the thin line is determining whether the center pixel is located on a horizontal straight line of the motion window.

9. The image noise reduction method of claim 5 wherein determining whether the center pixel is located on the thin line is determining whether the center pixel is located on a vertical straight line of the motion window.

10. The image noise reduction method of claim 5 wherein determining whether the center pixel is located on the thin line is determining whether the center pixel is located on a diagonal straight line of the motion window.

* * * * *